Patented Nov. 21, 1939

2,181,003

UNITED STATES PATENT OFFICE 2,181,003

SOLUBLE DRIED SOLIDS OF MILK AND METHOD OF PRODUCING THE SAME

Harold K. Salzberg, Pittsburgh, Pa., assignor to The Borden Company, New York, N. Y., a corporation of New Jersey No Drawing. Application January 11, 1936, Serial No. 58,757

11 Claims. (Cl. 260—119)

This invention relates to soluble dried solids of milk, skim milk or buttermilk and to processes by which the solubility in water of these materials may be increased.

One of the common methods of conserving milk solids is to remove most of the water from the fluid milk, fluid skim milk, or fluid buttermilk by artificial drying means. This process results in a substantially dry powder which, because of its dryness, will possess keeping quality of high order. The drying processes so applied not only constitute means of conserving fluid milk products and by-products, but also yield materials which are finding greater and greater use in commerce because of their keeping quality, convenience, and economy.

Formerly, these dried milk products and by-products were used almost exclusively in food stuffs, but recently it has appeared that, because of their composition and properties, they may find useful application in the industrial arts. In the case of dried milk products for use as food and in food products, it is desirable that, in general, these dried milk products should consist solely of the natural milk solids, without other addition thereto. This limitation does not, of course, apply to dried milk products or by-products to be used in the industrial arts. While the present invention can be so applied as to meet the requirements of alimentation, and therefore improve the properties of dried milk products to be used as food or in food-stuffs, its principal application will be in the preparation of dried milk products or by-products for industrial use.

One example of the utility of a milk powder of improved solubility in the industrial arts is its use as an adhesive. It has been found on investigation that the adhesive power of milk solids is improved by applying the treatment which is the subject of this invention. As a binder in sand or other finely divided inert material its strength is greatly increased. For example, in the art of making sand cores for foundry use as described in the patent to Weatherford No. 1,984,905, the application of the present solubilizing treatment to this class of adhesive results in core strengths and hardness at least twice those attained with untreated milk solids. This improvement in adhesive quality might also be utilized in the making of briquets with milk solids as the binder, or in any application where the treatment to be described can be applied.

A further illustration of the utility of solubilized milk solids lies in the making of emulsions using milk solids as the emulsifying base. With ordinary roller-dried milk powder, only dilute emulsions of oils in water, of relatively low stability, can be obtained. By applying the present process of bringing the milk solids into complete solution the same material so processed can serve as the emulsifying agent in a much more efficient manner, very stable emulsions of equal parts of water and oil being readily formed on merely stirring the oil with the water containing the milk solids in solution.

The object of this invention is to apply a process to milk, skim milk, buttermilk, or to modifications of these products, which substantially raises the solubility in water of the corresponding dried products.

The process of drying a milk product or milk by-product involves removing substantially all the water from the product by one or a combination of three general types of drying equipment: spray driers, atmospheric roller driers, vacuum roller driers. Spray drying involves the spraying of the milk, skim milk, or other milk by-products, either uncondensed or precondensed, through a fine nozzle into a suitable heated chamber. The roller process consists essentially in passing the product between two heated metallic rolls, the dried material issuing as a thin flaky film. The vacuum roller drier involves a similar procedure, except that the equipment usually has only a single roller and is entirely enclosed in a suitable chamber for carrying out the drying under diminished pressure.

In general, the spray process and the vacuum roller process as used commercially produce dried milk or skim milk solids of relatively high solubility as compared with the product of the atmospheric roller process, and the present invention will find its greatest usefulness in solubilizing those dry milk derivatives which have been manufactured by the atmospheric roller process, for example roller-dried skim milk powder, but it is not intended to be limited in its applications to such products. Any type of powdered milk solids which through agencies acting during the drying operation has had the solubility substantially reduced below complete solubility is benefited by the procedure described below.

In the fluid or dried milk product there is a determinable proportion of mineral salts present. By analysis this mixture of salts has been found to contain varying percentages of calcium oxide (CaO), and it is a matter of common knowledge that there is always associated with milk or with milk derivatives a certain small though definite and determinable amount of calcium.

It has been discovered that the solubility of dried milk solids products in water may be enhanced by treating the fluids from which such products are made with certain acids or salts of these acids or by adding to such dried products certain acids or salts which will react to produce the desired result when the dried product is dispersed in water. Laboratory tests have shown that only those acids and salts capable of yielding calcium salts less soluble in water than tricalcium phosphate ($Ca_3(PO_4)_2$) have any appreciable effect on the proportion of solids brought into solution in the standard solubility index test for milk powder, devised by Thompson, Stemmons and Fleming, and described in Journal of Dairy Science, volume 13, page 319, 1930. This indicates that the major part of the calcium in dried milk products is present as tricalcium phosphate, and experimentation has shown that the solubilizing effect is the result of the removal of calcium from the system by the formation of calcium salts less soluble than tricalcium phosphate. On examining a number of inorganic and organic salts, capable of giving relatively insoluble salts with calcium, only oxalates, fluorides and metaphosphates were effective, and according to the chemical literature these three types of salt provide the three most insoluble calcium salts known. The next least soluble known calcium salt is tricalcium phosphate, and the addition of phosphate ions has not shown any solubilizing effect.

As an example of the application of the present invention, one may consider its effect when applied to ordinary grades of roller-dried skim milk powder and to roller-dried buttermilk powder. The total calcium element present in these products will vary within certain limitations. The skim milk and buttermilk powders used in the tests which form the basis of these illustrations were found by chemical analysis to contain 1.88% and 2.89% of calcium oxide respectively. The solubility test showed them soluble in water to the extent of 71% and 53%, respectively. If then to these powders there is added in each case sufficient sodium oxalate to react stoichiometrically with the calcium oxide present in the powders these solubilities are increased to 96% and 84%, respectively.

In the case of the buttermilk powder, this material was found to give a strongly acid reaction. Therefore, sufficient alkali was added to neutralize most of this acid before the comparative solubility tests were made. Partial neutralization of strongly acid milk powder may be necessary before the effect of calcium removal becomes apparent, because under strongly acid conditions, formation of the extremely insoluble calcium salts is impossible.

The addition of anions, as acids or soluble salts, which react with calcium to produce salts more soluble than tricalcium phosphate has had in tests no solubilizing effect on milk solids. The effect is given only by those agents which provide calcium salts less soluble in water at room temperature than is tricalcium phosphate and the use of such agents for the above-described purpose comprises the substance of this invention. For purposes of closer definition the value of 0.0025 g. per 100 ml. of cold water will be taken as the solubility of tricalcium phosphate (Hodgman Handbook of Chemistry and Physics, 19th edition (1935), p. 341). This amount of tricalcium phosphate provides .009685 g. of calcium or 9.685 parts per million of water.

The present invention is not limited to the use of exactly the stoichiometric amount of these agents required to react with the precipitable calcium present. One may use more than the stoichiometric amount, thereby taking advantage of the common ion effect in the case of the oxalate or fluoride, and of the formation of calcium complexes in the case of the metaphosphate. For example, though calcium oxalate is only very slightly soluble, and the solubility of the milk solids is substantially complete when an amount of sodium oxalate is added equivalent chemically to the calcium present, still I have found a slightly greater effect and solubility brought very close to 100% when an excess of oxalate over the stoichiometric amount is used. Or I may use less than the stoichiometric amount of calcium-precipitating agent in order to only partially improve the solubility of the milk solids.

The solubilizing of the milk solids by the present invention is not to be confused with the effect produced when alkalis are added, as for example, caustic soda, borax, trisodium phosphate or sodium carbonate. These agents are solvents for milk protein, but exert their solubilizing effect through their alkalinity, soluble protein salts or even protein decomposition products being formed. In each case the resulting solution is highly alkaline. The present process involves the precipitation of calcium as the modus operandi and with any of the three types of agents now known as effective for this purpose, namely oxalates, fluorides, or metaphosphates (or the corresponding acids), the resulting solution is not highly alkaline and the protein has not been brought into solution through the direct action of alkali.

It will be understood from the foregoing that the solubilizing effect of the present invention is attributed to the formation of calcium salts less soluble in water than tricalcium phosphate. However, this invention is not intended to be limited by an theory as to the relation between the formation of such salts and the solubilizing effect upon the remaining milk solids, but is predicated solely upon the use of one or more of the salts or acids capable of reacting with the calcium present in dried milk solids products to form calcium salts less soluble than tricalcium phosphate.

The exact nature of the chemicals used for this purpose, as long as they contain the ions described above as being effective and are sufficiently soluble in water to provide enough ions to reduce the number of calcium ions, does not matter. For example, one may use the acid providing these ions, such as oxalic acid, hydrofluoric acid or metaphosphoric acid, or the sodium, ammonium or potassium salts of these acids or any other salt of these acids possessing the above mentioned requirement. Furthermore, the purity of the particular agent used, in respect to the proportion of effective ions present, is not to be considered as of any consequence as long as a sufficient concentration of these ions can be provided to effect the solubilizing action.

This process is to be considered as applicable to any form of the dried solids of milk, skim milk, or buttermilk which through the effects of processing has lost its solubility to a substantial degree.

The effective solubilizing agent may be added either to the milk before or during the drying process or to the dried and powdered product. In the former method the calcium ions are removed from effective concentration before drying the milk; in the latter method the agent is available for reaction with the calcium as soon as the powder is dispersed in water.

I claim:

1. A dry milk product comprising a mixture of dried milk powder of limited solubility in water and a reagent of the class consisting of acids and salts capable of reacting in water with the calcium of said powder to form a calcium salt less soluble in water than tricalcium phosphate, the proportion of said reagent being at least sufficient to react substantially stoichiometrically with the calcium in said powder.

2. A dry milk product comprising a mixture of roller dried skim milk powder and a reagent of the class consisting of acids and salts capable of reacting in water with the calcium of said powder to form a calcium salt less soluble in water than tricalcium phosphate, the proportion of said reagent being at least sufficient to react substantially stoichiometrically with the calcium in said powder.

3. A dry milk product comprising a mixture of roller dried buttermilk powder and a reagent of the class consisting of acids and salts capable of reacting in water with the calcium of said powder to form a calcium salt less soluble in water than tricalcium phosphate, the proportion of said reagent being at least sufficient to react substantially stoichiometrically with the calcium in said powder.

4. A dry milk product substantially free from strong alkalis comprising a mixture of dried milk powder of limited solubility in water and a reagent of the class consisting of acids and salts capable of reacting in water with the calcium of said powder to form a calcium salt less soluble in water than tricalcium phosphate, the proportion of said reagent being at least sufficient to react substantially stoichiometrically with the calcium in said powder.

5. A dry milk product consisting substantially of a mixture of roller dried milk powder and a reagent of the class consisting of acids and salts capable of reacting in water with the calcium of said powder to form a calcium salt less soluble in water than tricalcium phosphate, the proportion of said reagent being at least sufficient to react substantially stoichiometrically with the calcium in said powder.

6. An adhesive comprising milk solids, substantially free from strong alkali, said milk solids having the calcium chemically separated therefrom as a compound less soluble in water than tricalcium phosphate.

7. An adhesive consisting substantially of dry milk solids and a dry reagent of the class consisting of acids and salts capable of reacting in water with the calcium of said solids to form ac calcium salt less soluble in water than tricalcium phosphate, the proportion of said reagent being at least sufficient to react substantially stoichiometrically with the calcium in said solids.

8. A dry milk powder free from strong alkali, said milk powder having substantially all of the calcium thereof chemically separated as a calcium compound less soluble in water than tricalcium phosphate.

9. Dry skim milk free from strong alkali and having substantially all of the calcium thereof chemically separated as calcium oxalate.

10. Dry skim milk free from strong alkali and having substantially all of the calcium thereof chemically separated as calcium fluoride.

11. Dry skim milk free from strong alkali and having substantially all of the calcium thereof chemically separated as calcium metaphosphate.

HAROLD K. SALZBERG.